(12) United States Patent
Tanaka et al.

(10) Patent No.: US 9,796,349 B2
(45) Date of Patent: *Oct. 24, 2017

(54) WRAP-AROUND AIRBAG DEVICE

(71) Applicant: TOYODA GOSEI CO. LTD., Gun Aichi (JP)

(72) Inventors: Hiroki Tanaka, Inazawa-Airchi (JP); Jonathon David Ruddy, Brighton, MI (US); Dennis Ames Burton, Fenton, MI (US); Kimberly Cole, Swartz Creek, MI (US)

(73) Assignee: TOYODA GOSEI CO. LTD., Gun Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,371

(22) Filed: Apr. 28, 2016

(65) Prior Publication Data

US 2016/0244017 A1 Aug. 25, 2016

Related U.S. Application Data

(63) Continuation of application No. 14/834,826, filed on Aug. 25, 2015, now Pat. No. 9,365,182, which is a (Continued)

(51) Int. Cl.
*B60R 21/206* (2011.01)
*B60R 21/2334* (2011.01)
(Continued)

(52) U.S. Cl.
CPC .......... *B60R 21/206* (2013.01); *B60R 21/232* (2013.01); *B60R 21/233* (2013.01);
(Continued)

(58) Field of Classification Search
CPC .................... B60R 21/206; B60R 2021/23169
See application file for complete search history.

(56) References Cited

U.S. PATENT DOCUMENTS 3,768,830 A 10/1973 Hass
4,290,627 A 9/1981 Cumming et al.
(Continued)

FOREIGN PATENT DOCUMENTS

CN 1451570 A 10/2003
CN 1629014 A 6/2005
(Continued)

OTHER PUBLICATIONS

PCT International Search Report dated Feb. 3, 2011, PCT/US/2010/055408.
(Continued)

*Primary Examiner* — Ruth Ilan
(74) *Attorney, Agent, or Firm* — The Dobrusin Law Firm, P.C.

(57) ABSTRACT

An airbag device for a vehicle including at least one airbag housing interface chamber that attaches to an airbag housing; at least one airbag cushion chamber downstream of the at least one interface chamber; an elbow that fluidly connects the housing interface chamber with the cushion chamber and configured so that it controllably regulates gas flow into the at least one airbag cushion chamber; the elbow having an internal configuration, which includes at least one opening that permits back and forth gas flow between the elbow and the at least one airbag cushion chamber, and which controls the directional deployment of the airbag cushion chamber so that upon deployment the downstream end of the cushion chamber exits an airbag housing outwardly in a first direction and then in at least one second direction, so that the direction of deployment of the cushion chamber changes in direction to thereby wrap at least partially around a structure of a vehicle of the vehicle and at least temporarily interpose the cushion chamber between any occupant and the vehicle structure.

10 Claims, 3 Drawing Sheets

Related U.S. Application Data continuation of application No. 14/604,212, filed on Jan. 23, 2015, now abandoned, which is a continuation of application No. 13/764,898, filed on Feb. 12, 2013, now Pat. No. 8,998,249, which is a continuation of application No. 12/939,570, filed on Nov. 4, 2010, now Pat. No. 8,393,636.

(60) Provisional application No. 61/259,864, filed on Nov. 10, 2009.

(51) Int. Cl.

| | | |
|---|---|---|
| *B60R 21/2338* | (2011.01) | |
| *B60R 21/235* | (2006.01) | |
| *B60R 21/261* | (2011.01) | |
| *B60R 21/232* | (2011.01) | |
| *B60R 21/233* | (2006.01) | |
| *B60R 21/231* | (2011.01) | |
| *B60R 21/00* | (2006.01) | |

(52) U.S. Cl.
CPC ........ *B60R 21/235* (2013.01); *B60R 21/2334* (2013.01); *B60R 21/2338* (2013.01); *B60R 21/261* (2013.01); *B60R 2021/0032* (2013.01); *B60R 2021/0051* (2013.01); *B60R 2021/0053* (2013.01); *B60R 2021/23169* (2013.01); *B60R 2021/23308* (2013.01); *B60R 2021/23316* (2013.01); *B60R 2021/23324* (2013.01); *B60R 2021/23382* (2013.01)

(56) References Cited

U.S. PATENT DOCUMENTS

| | | |
|---|---|---|
| 4,300,894 A | 11/1981 | Cumming et al. |
| 6,715,789 B2 | 4/2004 | Takimoto et al. |
| 6,916,039 B2 | 7/2005 | Abe |
| 7,314,230 B2 | 1/2008 | Kumagai et al. |
| 7,434,837 B2 | 10/2008 | Hotta et al. |
| 7,549,671 B2 | 6/2009 | Mizuno et al. |
| 7,600,776 B2 | 10/2009 | Hoshino et al. |
| 7,963,550 B2 | 6/2011 | Hong et al. |
| 8,029,016 B2 | 10/2011 | Moritani |
| 8,042,831 B2 | 10/2011 | Hoffman et al. |
| 2002/0171232 A1 | 11/2002 | Abe |
| 2007/0222189 A1 | 9/2007 | Baumbach et al. |
| 2007/0246920 A1 | 10/2007 | Abele et al. |
| 2008/0030008 A1 | 2/2008 | Zofchak et al. |
| 2008/0157509 A1 | 7/2008 | Abe et al. |
| 2009/0212541 A1 | 8/2009 | Wallat et al. |
| 2010/0244410 A1 | 9/2010 | Chavez et al. |
| 2011/0095512 A1 | 4/2011 | Mendez |
| 2011/0101660 A1 | 5/2011 | Schneider et al. |
| 2011/0241319 A1 | 10/2011 | Chavez |
| 2011/0260434 A1 | 10/2011 | Gottschalk et al. |
| 2012/0205898 A1 | 8/2012 | Picard et al. |

FOREIGN PATENT DOCUMENTS

| | | |
|---|---|---|
| CN | 101452529 A | 6/2009 |
| DE | 19946477 A1 | 3/2001 |
| DE | 102007005304 A1 | 8/2008 |
| EP | 1354771 A1 | 10/2003 |
| EP | 1466791 A2 | 10/2004 |
| EP | 1598243 A1 | 11/2005 |
| EP | 1655183 A1 | 5/2006 |

OTHER PUBLICATIONS

PCT International Preliminary Report of Patentability dated Jan. 24, 2012, PCT/US/2010/055408.

Chinese Office Action, Application No. 201080049985.7 with Translation dated Jun. 4, 2014.

Chinese Office Action, Application No. 201080049985.7 with Translation dated Nov. 25, 2014.

Chinese Office Action, Application No. 201080049985.7 with Translation dated Apr. 16, 2015.

Chinese Office Action, Application No. 201080049985.7 with Translation dated Jul. 27, 2015.

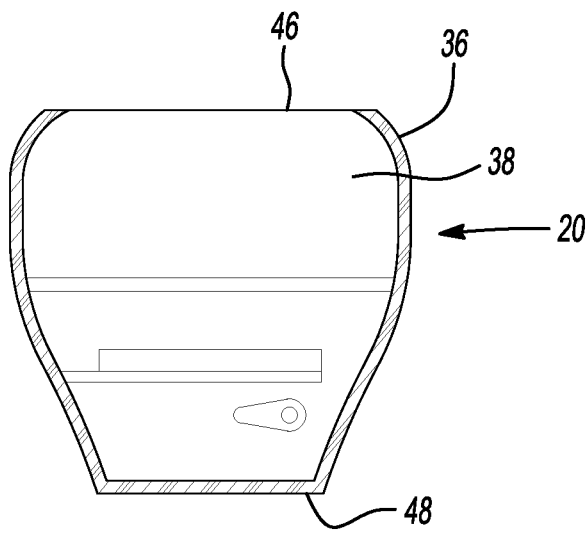
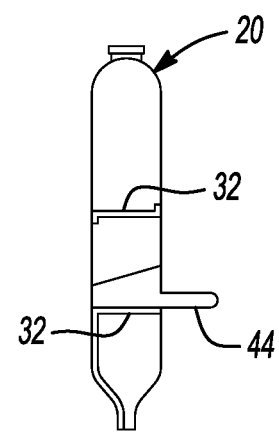
Fig -3A
Fig -3B
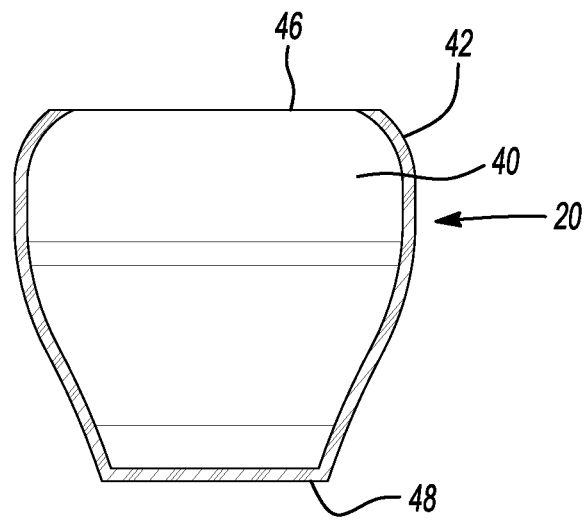
Fig -3C
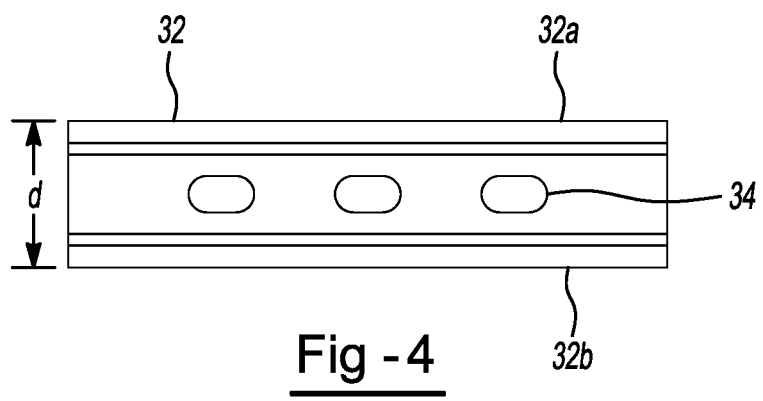
Fig -4

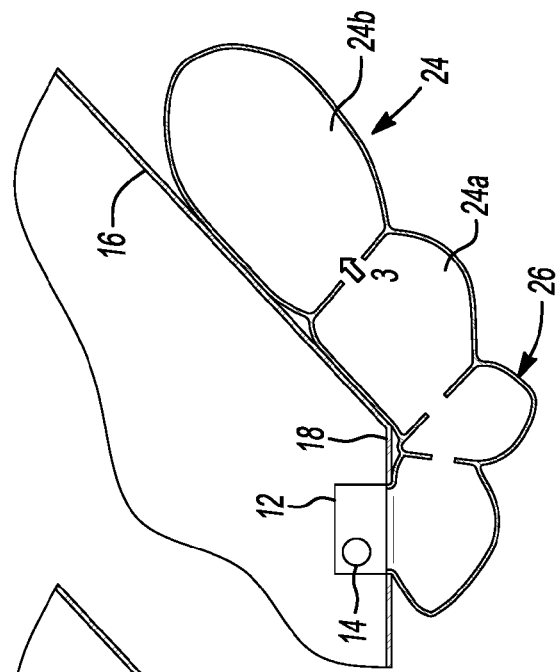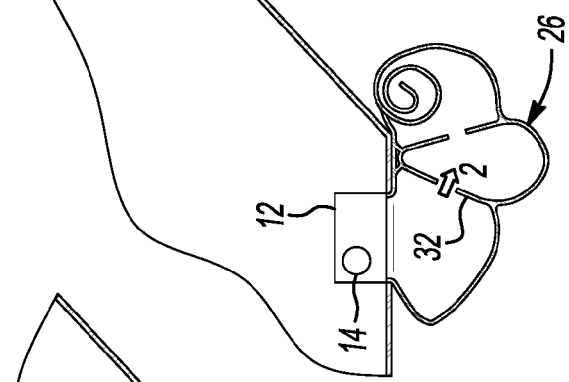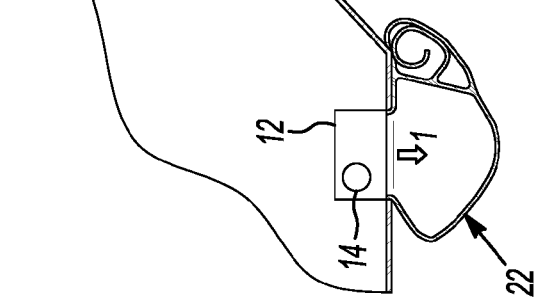

WRAP-AROUND AIRBAG DEVICE

CLAIM OF BENEFIT OF FILING DATE

The present application claims the benefit of the filing date of U.S. Provisional Application No. 61/258,884, filed Nov. 10, 2009, the contents of which are hereby expressly incorporated by reference.

FIELD OF THE INVENTION

The present invention relates generally to a wrap-around airbag device, and more particularly to a knee protecting airbag device, which is mounted so that an airbag inflates initially in a first direction, such as a downward facing direction, and then in a second direction so that it wraps upwardly and around an instrument panel.

BACKGROUND OF THE INVENTION

There have been considerable advancements in the airbag art in recent years. One field that has received attention is the protection of occupant legs by the use of knee airbags. One approach to the use of such airbags has been to house them in an instrument panel assembly, in generally opposing facing relationship with the legs of an occupant. Examples of such configurations are illustrated in U.S. Pat. No. 8,715, 789 and U.S. Pat. No. 7,434,837, incorporated by reference.

Recent developments in automotive vehicle design have created the need to re-locate knee airbag housings from a location generally contiguous with a occupant facing surface of an instrument panel to a location at the bottom of the instrument panel. For example, one desired approach is to design a vehicle cabin so that any knee airbag housing is located beneath the instrument panel, or so that the housing (which may thus avoid the need for a decorative cover) has a downward facing opening through which the airbag inflates.

Due to the large forces to which airbags are subjected during inflation there is a tendency, regardless of their structural configuration, for such airbags to inflate directly outward. For instance, during inflation, it is possible that substantially the entire volume of the airbag will be subjected simultaneously to substantially the same internal gas pressure.

Efforts to directionally control inflation have been unsuccessful in the absence of complicated structural arrangements. For example, in order to meet the need for wrapping upwardly and around the instrument panel, efforts have been made to incorporate a control element that connects the airbag to the airbag housing (such as by a rod fastening element), such as shown in Published U.S. Patent Application No. 2007/0246920, incorporated by reference. Another approach has been to include a structural blocking member opposite the airbag housing, against which the airbag contacts and deflects during inflation, which thus directionally guides the airbag as it inflates. For example, Published U.S. Patent Application No. 2007/0248920, incorporated by reference, illustrates the use of guidance hardware in the form of a horizontal housing bottom that subjects the bag to an "upwardly directed impulse". Such approaches require the presence of additional components that potentially add weight to a vehicle, add assembly steps, or both, thus affecting cost or attractiveness of the devices for various applications. Another illustration of an approach to airbag deployment is shown in DE 19946477A1, incorporated by reference.

It would be beneficial to have an improved wrap-around airbag device. For example, it would be beneficial to have an airbag device such as a knee airbag device, that could inflate through a downward facing opening. It would be especially beneficial if such an improved knee airbag device could wrap upwardly and around an instrument panel. It also would be especially beneficial if such an improved knee airbag device could avoid the need for guidance hardware or other structural arrangement located external of the bag for directionally controlling inflation.

SUMMARY OF THE INVENTION

The present invention meets some or all of the above needs by providing an airbag device for a vehicle including at least one airbag housing interface chamber that attaches to an airbag housing; at least one airbag cushion chamber (e.g., a leg cushion chamber) downstream of the at feast one interface chamber; an elbow that fluidly connects the housing interface chamber with the cushion chamber and configured internally (e.g., by use of a fabric panel structure) so that it controllably regulates gas flow into the at least one airbag cushion chamber; the elbow having an internal configuration, which includes at least one opening that permits back and forth gas flow between the elbow and the at least one airbag leg cushion chamber, and which controls the directional deployment of the airbag cushion chamber so that upon deployment the downstream end of the cushion chamber exits an airbag housing outwardly in a first direction (e.g., generally downward along a first axis that is below horizontal) and then in at least one second direction (e.g., generally along a second axis that is oriented different from the first axis, which may include a lateral directional component), so that the direction of deployment of the cushion chamber changes (e.g., in an upwardly direction) to thereby wrap at least partially around a component of a vehicle (e.g., an instrument panel) of the vehicle and at least temporarily interpose the cushion chamber between any occupant and the vehicle component (e.g., between a leg of any occupant and the instrument panel).

Because the airbag devices herein advantageously employ an internal panel structure for suitably regulating gas pressure within an airbag, while the bag is being deployed, it is possible that external guidance devices may be avoided for helping to achieve a wrap around. It is also possible to avoid the need for valve mechanisms for controlling gas flow. In this manner, it is now possible to mount airbag devices of relatively simple complexity in vehicle locations previously impractical due to inflation needs.

DESCRIPTION OF THE DRAWINGS

FIG. 3a is an elevation view of a device in accordance with the present teachings.

FIG. 3b is a side sectional view of the device of FIG. 3a.

FIG. 3c is an opposing elevation view of the device of FIG. 3a.

FIG. 4 is an elevation view of an illustrative tether panel.

FIGS. 5a-c are side sectional views to illustrate schematically an example of the inflation direction and sequence in accordance with the present teachings.

DETAILED DESCRIPTION

In general, the teachings herein pertain to an airbag device for a vehicle. The airbag device may include one or more airbags. The airbag device may include a housing structure (which in turn may have associated mounting hardware). The housing structure may foe configured with a generally outwardly (e.g., downwardly) facing opening (e.g., an opening that may be covered by at feast one pivotally attached door, or some other panel) through which a cushion chamber (e.g., a leg cushion chamber) of airbag initially exits the housing after it is deployed. The airbag device may have a suitable inflator. For example, it may include a container that liberates a gas into the one or more airbags upon being actuated in response to a sensed condition, such as a vehicle impact.

The housing structure may be attached so that it is generally beneath or otherwise adjacent a structure around which the airbag is intended to wrap. For example, it may be located on or adjoining a bottom (e.g., a bottom edge) of an instrument panel. Thus, the lowermost portion of the housing structure may be vertically above or at substantially the same height as the instrument panel bottom or bottom edge. The housing structure may be oriented so that it faces downward. The housing may be a relatively rigid structure having a predetermined configuration. It may be a relatively flexible structure (e.g., a fabric housing may be used).

Figure 1:
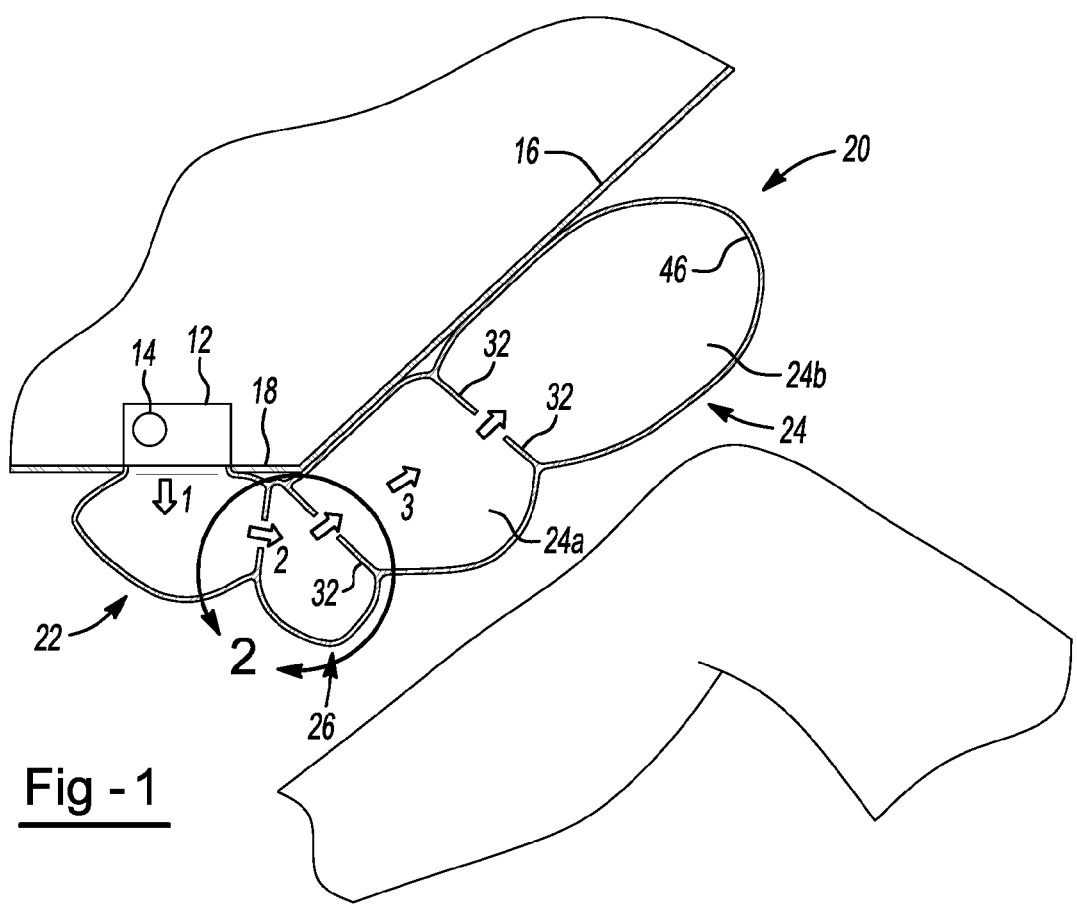
FIG. 1 is a side sectional view of a device in accordance with the present teachings, illustrating an airbag in an inflated state.

FIG. 1 illustrates an example of an airbag device 10, including a housing 12 with an associated inflator 14 (depicted in the housing, though it may at least partially external of the housing). The housing 12 is located adjacent an instrument panel 16, and is depicted in FIG. 1 as being aligned generally with a bottom edge 18 of the instrument panel.

The airbags of the airbag device may include multiple chambers (which themselves may include sub-chambers) that are connected to each other, and which may be partitioned relative to each other. The airbag chambers may be in fluid communication with each other and with the inflator. One or more of the chambers may have openings through which gas may exit the airbag during a deployment event, after such an event, or both.

The airbag device may be configured to include at least one airbag that has at least one airbag housing interface chamber that attaches to the airbag housing structure. At least one airbag cushion chamber may be located downstream of the at least one interface chamber. An elbow fluidly connects the housing interface chamber with the cushion chamber. The elbow desirably is configured so that it can controllably regulate gas flow into the at least one airbag cushion chamber. It may have an internal structure that is free of a valve mechanism, but stilt has a configuration (e.g., by use of a fabric panel structure) that controls gas flow. With reference to FIG. 1, an illustrative airbag 20 is shown. It includes a housing interface chamber 22, at least one cushion chamber 24 (shown in FIG. 1 as having two sub-chambers 24a and 24b). An elbow 26 fluidly connects the housing interface chamber 22 with the at least one cushion chamber 24, depicted as a leg cushion chamber.

For instance, the elbow may have an internal configuration that controls the directional deployment of the airbag cushion chamber so that upon deployment the downstream end of the cushion chamber exits an airbag housing outwardly in a first direction (such as in a first downward direction (e.g., generally along a first axis that is below horizontal, or possibly even at an angle greater than about 60°, 70°, 80° or even 90° below horizontal)) and then in at least one second direction (e.g., generally along a second axis that is oriented different from the first axis, which may include a lateral directional component), so that the direction of deployment of the cushion chamber changes in direction (e.g., in an upwardly direction) to thereby wrap at least partially around a structure (e.g., an instrument panel) of the vehicle and at least temporarily interpose the cushion chamber between an occupant and the structure of a vehicle (e.g., between a leg of any occupant and the instrument panel).

During deployment the elbow may provide a relatively rigid internal deflection surface, which may be generally concave, that re-directs gas flow in at least one second direction. Thus, the elbow may have at least one first wall and at least one opposing second wall. The walls may be connectingly bounded by one or more tethers, which in turn may have one or more openings or other passageways for allowing gas flow through or past the tethers.

More particularly, for managing the spatial distance between opposing panels, during inflation, an airbag may have its panels connected together by one or more tethers. At least two generally opposing panels may be connected together with at least one tether to define the elbow, the tether also separating the at least one cushion chamber (e.g., leg cushion chamber) from the elbow. The at least two generally opposing panels may be connected together with at least one tether to integrally define the elbow. It is also possible that the elbow may be separately fabricated and joined with either or both of the cushion chamber (e.g., leg cushion chamber) or the housing interface chamber.

The tethers may be generally flat. The tethers may be straps. The tethers may be elongated panels. The tethers may be cords. The tethers may be a woven structure. For example, a tether may be a generally elongated and flat tether panel (e.g., a fabric) having a first end and a second end. The tethers may be configured for restricting the passage of gas across it, such as by use of one or more openings, and which may be free of any valve mechanism (e.g., the tethers are free of any one way valve mechanism or check valve mechanism). The tethers thus may be such that two way gas flow across or through the tethers is possible. Thus, the tethers may include at least one opening through which gas is free to flow unrestricted into or out of adjoining chambers.

To form an elbow it is possible to employ an upstream tether and a downstream tether, with at least one elbow panel between them. For example, an upstream and a downstream generally elongated and flat tether panel (each having a first end and a second end) may connect with an elbow panel that defines an occupant facing wall. The elbow panel may be connected to the upstream tether panel at the second end of the upstream tether panel and at an upstream elbow panel end. The elbow panel may be connected to the downstream tether panel at the second end of the downstream tether panel and at the downstream elbow panel end.

Figure 2:
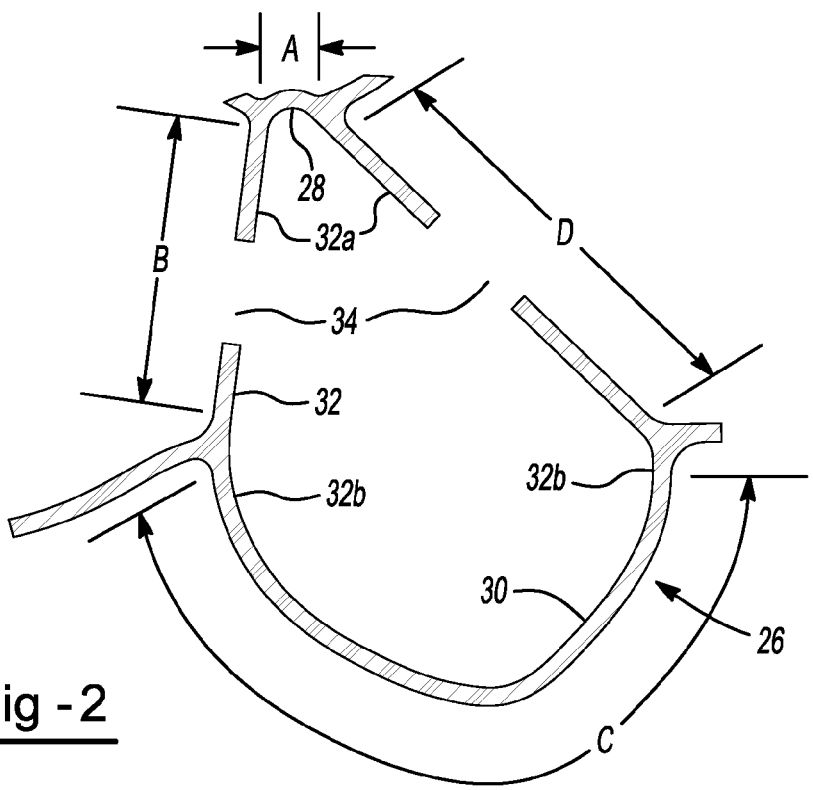
FIG. 2 is an enlarged view of the section circled in FIG. 1.

By way of illustration, FIG. 2 depicts a first wall 28, a second wall 30, and a pair of tethers 32 (with first end 32a and second end 32b). Each of the tethers 32 has at least one opening 34, respectively (see also, FIGS. 5a-c). As seen in FIGS. 1 and 2, the second wall 30 is an elbow panel having an exterior surface that defines an occupant facing wall. The interior of the elbow may be generally concave when inflated.

Airbags of the devices herein may be made by opposing panels that are suitably connected to each other. Suitable cloth or membrane may be stitched or otherwise joined together substantially about their peripheries. The material of the airbags may be the same as or different from that of the tethers. Thus, the airbags herein may include at least two generally opposing panels that are connected together to define the cushion chamber, the housing interface chamber, or both. For example, the generally opposing panels may include a first panel (e.g., a panel of a knee airbag facing forward in a vehicle) and a separate second panel (e.g., a panel of a knee airbag facing rearward in a vehicle) that is connected to the first panel. FIGS. 3a-c illustrate an example of a possible configuration for an airbag. A first panel 36 may be connected adjacent at least a portion of its periphery 38 with a second panel 40, also adjacent at least a portion of its periphery 42.

To accommodate the integral formation of an elbow, it is possible to include an intermediate section 44 (e.g., a section of extra airbag material that may be folded upon itself). Tethers are attached between panels, and may generally span the width of the panels. For example, as seen in FIGS. 3a-c, tethers 32 are shown.

The panels need not necessarily be separate structures. They may be defined, for example, by folding over a single sheet. Three or more sheets of material may be suitably connected to define the opposing panels. The individual sheets may be the same or a different material, or have the same or different material characteristics, and/or surface treatment. The airbags may have a downstream end 46 and an upstream end 48 that are generally straight, generally parallel to each other, or both. The width of the downstream end may be larger than the width of the upstream end (e.g., by a factor greater than about 1, about 1.2, about 1.5, or even greater than about 2). The side edges of the airbag as defined between the upstream end and the downstream end generally may taper outwardly, inwardly, or both. The side edges may exhibit no taper. At least one of the ends, the side edges, or each may include one or more curves, straight portion or both. As seen in FIGS. 3a and 3c, the side edges taper outwardly at the downstream end 46, and then follow a generally arcuate path that tapers inwardly at the upstream end.

For facilitating the sequence and direction of expansion desired for the airbags herein, the elbow may be configured so that it has panel 28 with a length (A), and panel 30 with a length (C) that is longer than at least about 2, 3, 4, 5, 6, 7, or even 8 times the length (A). The panel 28 may be tethered to the outer facing panel by a first tether having a tether length (B) and a second tether, having a tether length (D) that is longer than the length (B). The tether length of (D) may be substantially the same as, greater than, or less than the tether length of (B). The lengths of (B), (C), and (D) are selected relative to each other so that it creates a directional path for the gas during inflation which directs the chamber angles and/or directions upon pressurization. It is also possible that the panel 28 may be omitted or reduced to a convergence point. Thus, the elbow may be defined by the panel (C) and be bounded by tethers that converge at their ends at the convergence point. For example, with reference to FIGS. 1 and 2, an upstream tether 32 may be configured and dimensioned so that it limits the downward excursion of the airbag. Panel 28 creates a deflection surface for achieving wrap-around, and a downstream tether 32 provides the escape path of a gas built up in the elbow into the cushion chamber. Inflation may be accomplished in the absence of any one-way valve mechanisms that separate chambers.

The at least one tether may include any suitable structure that can connect opposing panels, but allow gas to pass between chambers. The tethers may be free of any one-way valve mechanism or check valve mechanism. For example, the tethers may include an elongated panel (e.g., a structure that is generally flat) having at least one opening in the panel through which gas flows when exiting the elbow into the cushion chamber (e.g., leg cushion chamber). Each tether defining the elbow includes an elongated panel (e.g., a structure that is generally flat) having at least one opening in the panel through which gas flows. It is possible that the openings in the elbow tether adjoining the cushion chamber (e.g., leg cushion chamber) may have an area that is less than the area of the openings of any elbow tether adjoining the housing interface chamber. The tethers may have a generally rectangular outer periphery. It is possible that a passage for airflow will be defined between the outside of the edges (e.g., the lateral peripheral edges) and the inner walls of the airbag panels.

The ratio of the opening sizes in the respective tethers may be such that it causes the elbow to inflate substantially entirely before the cushion chamber inflates. For example, the openings may be such that the flow rate of gas into the elbow, while the elbow inflates, exceeds the flow rate of gas out of the elbow chamber (e.g., by at least about 20%, 30%, 50% or higher). During inflation, therefore, gas accumulates in the elbow creating a significantly higher pressure in the elbow than in the cushion chamber, until the elbow is substantially entirely inflated, after which the pressure increases in the cushion chamber. This may be achieved in the absence of use of a one-way valve mechanism or check valve mechanism between any of the chambers. The tethers may be located proximate each end of the elbow and each is configured with at least one opening through which gas flows. For example, at least one tether may be proximate each end of the elbow and each is configured with at least one opening through which gas flows, and the opening for gas flow is larger at the end of the elbow adjoining the housing interface chamber so that as gas enters the elbow it is temporarily accumulated in the elbow for causing the elbow to rigidity and effectively deflect further flow of the gas into the cushion chamber.

One or more tethers may be used for partitioning a chamber. For example, one or more partitioning tether may be employed to separate the leg cushion chamber into two or more sub-chambers. With reference to FIG. 1, for example, one or more partitioning tether 32 may partition a leg cushion chamber into an upstream sub-chamber 24a and a downstream sub-chamber 24b. Any tether for connecting panels, for partitioning chambers, or both, may have a structure as described in U.S. Pat. No. 7,434,837, (e.g., col. 6, line 65—col. 7, line 60), incorporated by reference. The tether, thus, may be a generally elongated plate shape with one or more apertures in it. For example, FIG. 4 illustrates a tether 32 having a dimension (d) and one or a plurality of apertures 34. One or more of any such apertures may be of a suitable shape and size for allowing passage of gas so that sequential chamber formation is achieved (e.g., as gas is emitted from the inflator, sub-chambers expand in a sequence starting from the sub-chamber closest to the inflator, and then open successively in each adjoining downstream sub-chamber). Moreover, any such apertures may be sized and shaped sufficiently to assure appropriate limitation on outward travel of the airbag is inflating. Examples of aperture shapes include circles, ovals, ellipses, triangles, rectangles, other polygons or any combination thereof.

By way of illustration FIGS. 5a-c depict one possible example of the inflation direction and sequence of an airbag. FIG. 5a illustrates the airbag in an initial outward deployment state, in which the direction of outward deployment is generally downward in the direction of the arrow 1. FIG. 5b illustrates the airbag in a second and subsequent partial deployment state, wherein the elbow 28 becomes inflated. During inflation, the upstream tether 32 internally limits outward travel of the airbag, and as a result of pressure build-up, causes the airbag to open generally laterally in the direction of the arrow 2. FIG. 5*c* illustrates the airbag completely deployed and shows how it has wrapped around the instrument panel 16. It has followed a path of expansion in a third direction as shown by the arrow 3. A delay occurs between the initial expansion of the elbow and the subsequent expansion of the cushion chamber 24 as pressure builds in the elbow. However, the delay is sufficiently timed so that the cushion chamber 24 is still able to provide cushion to ah occupant in the event of a sensed impact.

As can be appreciated from the above, one or more various benefits are possible in accordance with the teachings herein. By way of example, the airbag devices herein may be free of guidance hardware or other structural arrangement located external of the airbag for directionally controlling inflation. The airbag devices may be free of a door or at least free of an ornamental door or other cover. The airbag devices may be free of a housing that opens for deployment of the airbag primarily in a lateral direction (e.g., from an occupant facing side of an instrument panel).

Other design variations are possible. By way of example, in its fully deployed condition, for a driver side system, the airbag herein (e.g., the downstream end of a leg cushion chamber) may be vertically below a steering column of the vehicle. However, it is possible that such an airbag may be configured to wrap around the steering column when fully deployed. For example, the downstream end of the airbag may have a cutout for the steering column. The airbag devices may be free of a one-way valve mechanism or a check valve mechanism (e.g., there is no valve mechanism employed for controlling air flow between adjoining chambers).

Though depicted in its preferred application as a knee airbag, the airbags may be used for other applications in a vehicle. Other applications may include those in which deployment of the airbag necessarily must be initially in a first outward (e.g., downward) direction, and then changes direction due to at least one change in gas flow direction (e.g., laterally, upwardly, or both) and due primarily to its internal structure, the airbag wraps around a part. Examples include airbags that wrap around a seatback, an armrest, a console, a headliner, an instrument panel, or otherwise. The airbag devices herein may be configured to inflate from an airbag housing along at least three generally axial directions, each differing from each other (e.g., by an amount of at least about 20°, 30°, 45°, 60°, 90°, or even 120°). By way of illustration, with reference to FIGS. 5*a-c*, the angular difference between arrow 1 and arrow 2 is greater than about 90°, as is the angular difference between arrow 2 and arrow 3. It can be seen that, though not a requirement of the teachings, the teachings herein may be employed so that the overall sum of wrap-around angles herein exceed 180°.

The opening between adjoining chambers may be defined by at least one tether and includes one or more holes in the tether. The opening may include a space defined between an end of the tether and in inside wall of a chamber that runs generally along the periphery of the chamber interior. The openings may include a hole having a curved edge, a flat edge or both. The opening may be shaped generally as a "D", and/or an "O". The airbag may be such that it is rolled, tucked and/or folded for containment with an inflator in a housing. The upper and lower ends of the chambers when inflated span greater than at least about 50%, 60%, 70% or even 80% of the widest span of the chambers (e.g., the span of the chambers at about its mid-point). The airbag as a whole may constitute a generally single celled structure. The airbag may be free of an assembly of a plurality of individual joined airbag cells. As seen in the drawings (e.g., FIG. 3A), there may be a suitable structure for attaching the airbag to the inflator.

References to the direction of travel being "generally along a first axis and then in at least one second direction generally along a second axis" does not necessarily require that the path travel be linear, nor does it exclude that the path of travel may include an arcuate component. Such travel may be arcuate, so that the overall path of travel of the airbag is an arc, or includes a portion of an arc. The travel may include a substantially linear portion and an arcuate portion. It may include plural arcuate portions, which have substantially the same or a different radius of curvature.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. References to "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. For example, the elbow may be integral with at least one of the housing interface chamber or the leg cushion chamber. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items), or to indicate a particular preference or order; such additional items are also contemplated, unless otherwise stated.

Though not necessarily drawn to scale, geometries, relative proportions and dimensions shown in the drawings are also part of the teachings herein, even if not explicitly recited. However, unless otherwise stated, nothing shall limit the teachings herein to the geometries, relative proportions and dimensions shown in the drawing.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. Other combinations are also possible as will be gleaned from the following claims, which are also hereby incorporated by reference into this written description.

The invention claimed is:

1. An airbag device for a vehicle comprising:
   (a) a housing;
   (b) an inflator at least partially located in the housing;
   (c) an airbag folded and accommodated in the housing, and the airbag includes:
      (i) at least one airbag housing interface chamber that is attached to the housing and is in fluid communication with the inflator;
      (ii) at least one elbow that is fluidly connected to the at least one airbag housing interface chamber by a first opening;
      (iii) at least one airbag cushion chamber that is fluidly connected to the at least one elbow by a second opening;
   wherein the housing is located on or adjoining a bottom of an instrument panel and includes a downward facing opening;
   wherein when the airbag is in an inflated state;
      (i) the at least one airbag housing interface chamber is located below the housing and anterior to a forward end of the housing;
      (ii) the at least one elbow is located rearward of the at least one airbag housing interface chamber; and
      (iii) the at least one airbag cushion chamber elongates in an upwardly direction from the at least one elbow and is located in between a leg of any occupant and the instrument panel.

2. The airbag device of claim 1, wherein the at least one elbow fluidly connects the at least one airbag housing interface chamber with the at least one airbag cushion chamber, the at least one elbow having an internal configuration which controls a directional deployment of the at least one airbag cushion chamber, so that upon deployment a downstream end of the at least one airbag cushion chamber exits the housing outwardly in a first direction and then in at least one second direction, so that the directional deployment of the at least one airbag cushion chamber changes between the first direction and the second direction to thereby wrap at least partially around the instrument panel of the vehicle and at least temporarily interpose the at least one airbag cushion chamber between the occupant and the instrument panel.

3. The airbag device of claim 1, wherein the airbag includes:
   a first tether located between the at least one airbag housing interface chamber and the at least one elbow; and
   a second tether located between the at least one elbow and the at least one airbag cushion chamber.

4. The airbag device of claim 3, wherein the first opening and the second opening are one or more holes in the first tether and the second tether.

5. The airbag device of claim 3, wherein the at least one airbag cushion chamber, the at least one airbag housing interface chamber, or both include an inside wall which runs generally along a periphery of an interior of the at least one airbag cushion chamber, the at least one airbag housing interface chamber, or both;
   wherein the first opening includes a space defined between an end of the first tether and the inside wall; and
   wherein the second opening includes a space defined between an end of the second tether and the inside wall.

6. The airbag device of claim 3, wherein the airbag includes:
   a first panel; and
   a second panel located rearward of the first panel;
      wherein the first panel is connected adjacent at least a portion of a periphery of the first panel to the second panel adjacent at least a portion of a periphery of the second panel to define the at least one airbag housing interface chamber and the at least one airbag cushion chamber;
      wherein the first panel is connected to the first tether at a first end of the first tether and connected to the second tether at a first end of the second tether;
      wherein the second panel is connected to the first tether at a second end of the first tether and connected to the second tether at a second end of the second tether; and
      wherein a length of the second panel between the second ends of the first tether and second tether is longer than a length of the first panel between the first ends of the first tether and the second tether.

7. The airbag device of claim 6, wherein the first ends of the first tether and the second tether converge at a convergence point.

8. The airbag device of claim 3, wherein the airbag includes:
   a vehicle side portion; and
   an occupant side portion located rearward of the vehicle side portion;
      wherein the vehicle side portion is connected to the first tether at a first end of the first tether and connected to the second tether at a first end of the second tether,
      wherein the occupant side portion is connected to the first tether at a second end of the first tether and connected to the second tether at a second end of the second tether; and
      wherein a length of the occupant side portion between the second ends of the first tether and the second tether is longer than a length of vehicle side portion between the first ends of the first tether and the second tether.

9. The airbag device of claim 8, wherein the first ends of the first tether and the second tether converge at a convergence point.

10. The airbag device of claim 8, wherein the vehicle side portion is a portion of the airbag which faces forward in the vehicle and the occupant side portion is a portion of the airbag which faces rearward in the vehicle.

* * * * *